US012792909B2

(12) United States Patent
Dai

(10) Patent No.: US 12,792,909 B2
(45) Date of Patent: Nov. 10, 2026

(54) CONTENT RECOMMENDATION METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventor: Wei Dai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 708 days.

(21) Appl. No.: 18/213,113

(22) Filed: Jun. 22, 2023

(65) Prior Publication Data

US 2023/0334314 A1 Oct. 19, 2023

Related U.S. Application Data

(63) Continuation of application No. PCT/CN2022/121984, filed on Sep. 28, 2022.

(30) Foreign Application Priority Data

Nov. 19, 2021 (CN) ......................... 202111399824.7

(51) Int. Cl.
*G06N 3/04* (2023.01)
*G06N 3/045* (2023.01)
(Continued)

(52) U.S. Cl.
CPC ............... *G06N 3/08* (2013.01); *G06N 3/045* (2023.01); *G06N 5/022* (2013.01)

(58) Field of Classification Search
CPC ............................... G06N 3/045; G06N 5/022
See application file for complete search history.

(56) References Cited

U.S. PATENT DOCUMENTS

2019/0207985 A1* 7/2019 Yuan ..................... H04L 63/205
2020/0311159 A1 10/2020 Ahlstrom et al.
(Continued)

FOREIGN PATENT DOCUMENTS

CN 109543066 A 3/2019
CN 109685631 A 4/2019
(Continued)

OTHER PUBLICATIONS

Ouaftouh, Sara, Ahmed Zellou, and Ali Idri. "Social recommendation: A user profile clustering-based approach." Concurrency and Computation: Practice and Experience 31.20 (2019): e5330. (Year: 2019).*
(Continued)

*Primary Examiner* — Hal Schnee
(74) *Attorney, Agent, or Firm* — Morgan, Lewis & Bockius LLP

(57) ABSTRACT

Disclosed is a content recommendation method performed by a computer device, and relates to the field of computer technologies. The method includes: acquiring positive sample content and negative sample content corresponding to a sample account; extending the positive sample content via recall extension to obtain extended sample content; and training a first recall model based on a matching relationship between the positive sample content, the extended sample content, and the negative sample content to obtain a second recall model, wherein the second recall model is configured to recommend content to an account.

17 Claims, 6 Drawing Sheets

(51) Int. Cl.
*G06N 3/08* (2023.01)
*G06N 5/022* (2023.01)

(56) References Cited

U.S. PATENT DOCUMENTS

| | | | | |
|---|---|---|---|---|
| 2023/0297832 | A1* | 9/2023 | Oh | G06N 3/0895 |
| 2023/0410155 | A1* | 12/2023 | Fei | G06F 16/9535 |

FOREIGN PATENT DOCUMENTS

| | | | |
|---|---|---|---|
| CN | 110008399 | A | 7/2019 |
| CN | 110703924 | A | 1/2020 |
| CN | 110717069 | A | 1/2020 |
| CN | 111368934 | A | 7/2020 |
| CN | 111523050 | A | 8/2020 |
| CN | 111738805 | A | 10/2020 |
| CN | 111831924 | A | 10/2020 |
| CN | 112231590 | A | 1/2021 |
| CN | 112818237 | A | 5/2021 |
| CN | 113256190 | A | 8/2021 |
| CN | 113297417 | A | 8/2021 |

OTHER PUBLICATIONS

Tencent Technology, WO, PCT/CN2022/121984, Dec. 15, 2022, 4 pgs.
Tencent Technology, IPRP, PCT/CN2022/121984, May 2, 2024, 5 pgs.
Tencent Technology, ISR, PCT/CN2022/121984, Dec. 15, 2022, 3 pgs.

* cited by examiner

CONTENT RECOMMENDATION METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/121984, entitled "CONTENT RECOMMENDATION METHOD AND APPARATUS, DEVICE, STORAGE MEDIUM, AND PROGRAM PRODUCT" filed on Sep. 28, 2022, which claims priority to claims priority to Chinese Patent Application No. 202111399824.7, entitled "CONTENT RECOMMENDATION METHOD AND APPARATUS, DEVICE, STORAGE MEDIUM, AND PROGRAM PRODUCT" filed with the China National Intellectual Property Administration on Nov. 19, 2021, all of which is incorporated by reference in its entirety.

FIELD OF THE TECHNOLOGY

Embodiments of this application relate to the field of computer technologies, and in particular, to a content recommendation method and apparatus, a device, a storage medium, and a program product.

BACKGROUND OF THE DISCLOSURE

Content recommendation is usually applied to a variety of application scenarios such as video content recommendation, news content recommendation, and product content recommendation. For example, after authorization of a user is obtained, static attribute data and historical operation data of the user are acquired, and content that matches an interest point of the user is recalled from a content pool through a first recall model and displayed to the user.

In the related technologies, the first recall model is trained based on sampled positive sample content and negative sample content corresponding to a sample account, and is trained based on an interactive relationship between the positive sample content and the sample account and a non-interactive relationship between the negative sample content and the sample account.

However, during training of the first recall model, the first recall model is trained only based on whether the sample account interacts with the sample content, that is, only a single-point target is involved in the training, resulting in low accuracy of model training and low accuracy of content recommendation.

SUMMARY

Embodiments of this application provide a content recommendation method and apparatus, a device, a storage medium, and a program product, which can improve the accuracy of content recommendation. The technical solutions will be described below.

In an aspect, a content recommendation method is performed by a computer device, which includes:

- acquiring positive sample content and negative sample content corresponding to a sample account;
- extending the positive sample content via recall extension to obtain extended sample content; and
- training a first recall model based on a matching relationship between the positive sample content, the extended sample content, and the negative sample content to obtain a second recall model, wherein the second recall model is configured to recommend content to an account.

In another aspect, a computer device is provided, which includes a processor and a memory. The memory stores at least one piece of instruction, at least one segment of program, a code set or an instruction set that, when loaded and executed by the processor, causes the computer device to implement the content recommendation method according to any one of the foregoing embodiments of this application.

In another aspect, a non-transitory computer-readable storage medium is provided, which stores at least one piece of instruction, at least one segment of program, a code set or an instruction set that, when loaded and executed by a processor of a computer device, causes the computer device to implement the content recommendation method according to any one of the foregoing embodiments of this application.

DESCRIPTION OF EMBODIMENTS

Content recommendation is usually applied to a variety of application scenarios such as video content recommendation, news content recommendation, and product content recommendation.

Recall, as a front end of a recommendation system, usually determines upper and lower limits of the recommendation system. A deep learning model commonly used at a recall side is a two-tower deep neural network (DNN), which includes a user tower and a feed tower. The user tower is configured to extract a feature of a user account, and the feed tower is configured to extract a feature of content. K pieces of content meeting requirements are provided by taking inner product maximization as an online retrieval method, and K is a positive integer.

However, in the related technologies, a target of a recall model is generally a click-through rate that reflects an interest of a user. For example, the model is trained by taking an interaction rate of saves, follows, thanks, or the like within playback duration exceeding a certain time period as a positive sample target, which may be understood as prediction of a single value of comprehensive interests of a user. However, positive behavior of a user is actually a single point sampled from an interest distribution of the user, which lacks a description of the entire interest distribution.

Figure 1:
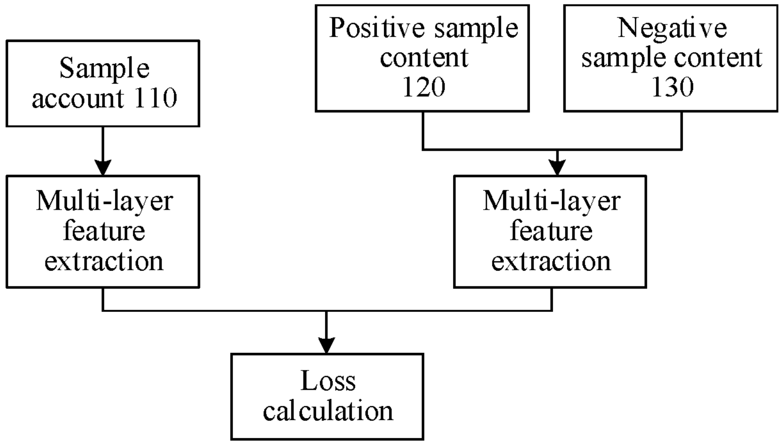
FIG. 1 is a schematic diagram of a training process of a first recall model in the related technology according to an exemplary embodiment of this application.

Exemplarily, as shown in FIG. 1, in the related technology, positive sample content 120 and negative sample content 130 corresponding to a sample account 10 are acquired. A ratio of the positive sample content 120 to the negative sample content 130 is generally between one to tens and one to hundreds, that is, the quantity of negative sample content 130 is much greater than the quantity of positive sample content 120. Then, a feature of the positive sample content 120, a feature of the negative sample content 130, and an information feature of the sample account 110 are extracted, a loss is calculated based on the feature of the positive sample content 120, the feature of the negative sample content 130, and the information feature of the sample account 110, and a recall model is trained, so that content can be recalled according to a single interest point of a receiving account when account information of the receiving account is analyzed.

When the loss is calculated based on the feature of the positive sample content 120, the feature of the negative sample content 130, and the information feature of the sample account 110, and the recall model is trained, a positive sample and a negative sample are generally spliced together for softmax cross-entropy loss calculation, and for each piece of sample, a cross-entropy loss function is solved by taking the $0^{th}$ content in a feed tower as a positive sample and others as negative samples, so as to realize account interest fitting. However, during training, in each account interest fitting process, the model learns an interest tendency represented by a positive sample only, that is, learns a feature of a single interest point.

According to a content recommendation method provided in the embodiments of this application, when a first recall model is trained, in addition to positive sample content and negative sample content, extended sample content that is extended based on the positive sample content is added, so that a single interest point of a sample account is extended to an interest distribution of the sample account based on the extended sample content.

Figure 2:
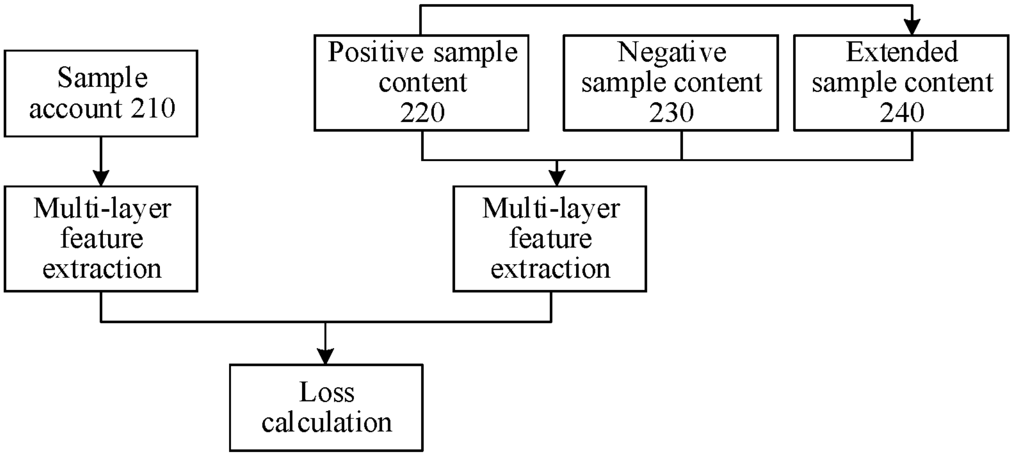
FIG. 2 is a schematic diagram of a training process of a first recall model according to an exemplary embodiment of this application.

Exemplarily, as shown in FIG. 2, in the embodiments of this application, positive sample content 220 and negative sample content 230 corresponding to a sample account 210 are acquired, extension is performed for the positive sample content 220 is extended to obtain extended sample content 240, a feature of the positive sample content 220, a feature of the negative sample content 230, a feature of the extended sample content 240, and an information feature of the sample account 210 are extracted, a fused loss is calculated based on the feature of the positive sample content 220, the feature of the negative sample content 230, the feature of the extended sample content 240, and the information feature of the sample account 210, and a recall model is trained, so that content can be recalled according to an interest distribution of a receiving account when account information of the receiving account is analyzed.

That is, when interests of an account are learned based on a loss, the feature of the positive sample content 220, the feature of the negative sample content 230, the feature of the extended sample content 240, and the information feature of the sample account 210 are fused. In the account interest fitting process, not only an interest tendency represented by a positive sample is learned, but also an interest tendency represented by an extended sample that is recalled based on the positive sample is learned. That is, the positive sample represents the strongest interest point, and the extended samples, as weakly positive samples, represent other interest points weaker than the strongest interest point, so that a generalized interest distribution composed of multiple interest points of the account is reflected by the forgoing extended samples and positive sample. Therefore, the model can learn an interest distribution of the sample account rather than the single interest point corresponding to the positive sample. A difference between the single interest point and the interest distribution is that the single interest point can represent the strongest single interest tendency of the account only, and the interest distribution can represent a weakened interest tendency in addition to the strongest interest tendency of the account, so that a hidden variable distribution represented by the positive sample can be fit better, and the interest distribution of the account that is finally learned by the model is more in line with the change of interest tendency (including not only special liking, but also weakened interest tendencies such as more liking, general liking, and somewhat liking).

For interest point-based point estimation model construction, an account interest representation obtained based on a positive sample as the strongest single interest point is mutant. Interest distribution-based model construction achieved by extension based on a positive sample can approach the hidden variable distribution behind the sample, so that a fit account interest distribution is smoother and more in line with the account interest tendency, and the recommendation accuracy of the model when applied to downstream recommendation is improved. Moreover, the interest distribution of the account rather than the single interest point is fit, and when content is recalled, the diversity of recalled content is enriched instead of recommending content of a single type.

Figure 3:
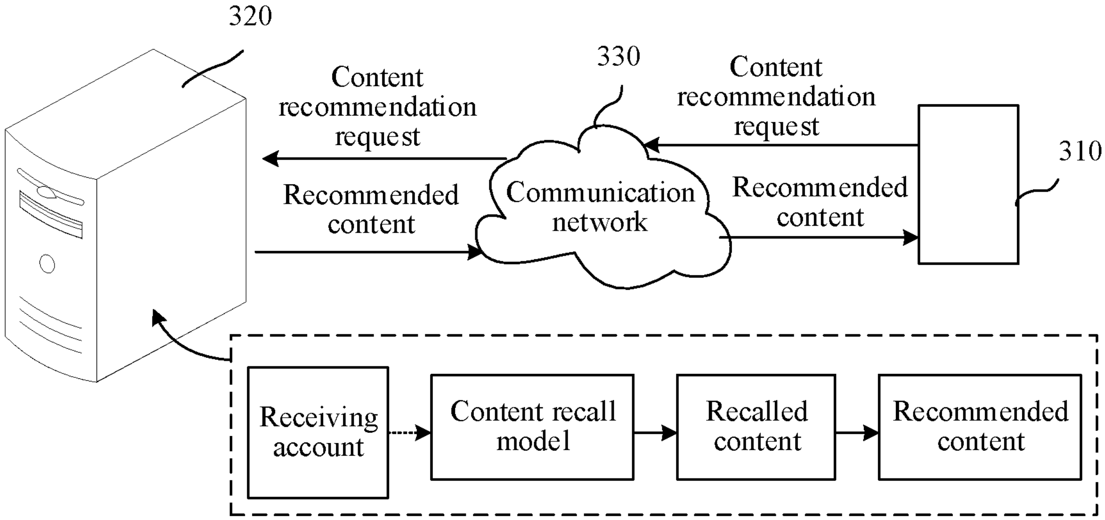
FIG. 3 is a schematic diagram of an implementation environment according to an exemplary embodiment of this application.

Next, an implementation environment involved in the embodiments of this application is described. Exemplarily, referring to FIG. 3, the implementation environment involves a terminal 310 and a server 320 that are connected through a communication network 330.

In some embodiments, the terminal 310 is installed with a target application program with the content browsing function, which includes a video playback program, a music playback program, a news browsing program, a shopping program, a short video program, and the like, and is not defined herein. The terminal 310 transmits a content recommendation request to the server 320 based on an interaction operation of a user on a content browsing interface, to request the server 320 to recall and recommend content.

After receiving the content recommendation request reported by the terminal 310, the server 320 recalls content based on the content recommendation request for a receiving account logged in the terminal 310. A content recall model is trained based on positive sample content and negative sample content corresponding to a sample account and extended sample content. The server 320 analyzes the receiving account through the content recall model to obtain recalled content, performs processing, such as sorting and random addition, on the recalled content to obtain recommended content, and feeds back the recommended content to the terminal 310.

The foregoing terminal may be a variety forms of terminal devices such as a mobile phone, a tablet computer, a desktop computer, a laptop computer, and a smart television, which is not defined herein.

It is worthwhile to note that the foregoing server may be an independent physical server, may be a server cluster or distributed system composed of a plurality of physical servers, or may be a cloud server providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform.

Cloud technology refers to a hosting technology that unifies a series of resources, such as hardware, software, and networks, in a wide area network or a local area network to realize calculation, storage, processing, and sharing of data.

In some embodiments, the foregoing server may also be implemented as a node in a blockchain system.

It will be appreciated that in a specific implementation mode of this application, relevant data, such as user information, account information, and historical interaction data, is involved, and when the foregoing embodiments of this application are applied to a specific product or technology, user permission or consent is required, and collection, use, and processing of the relevant data shall comply with relevant laws and regulations and standards of relevant countries and regions.

Figure 4:
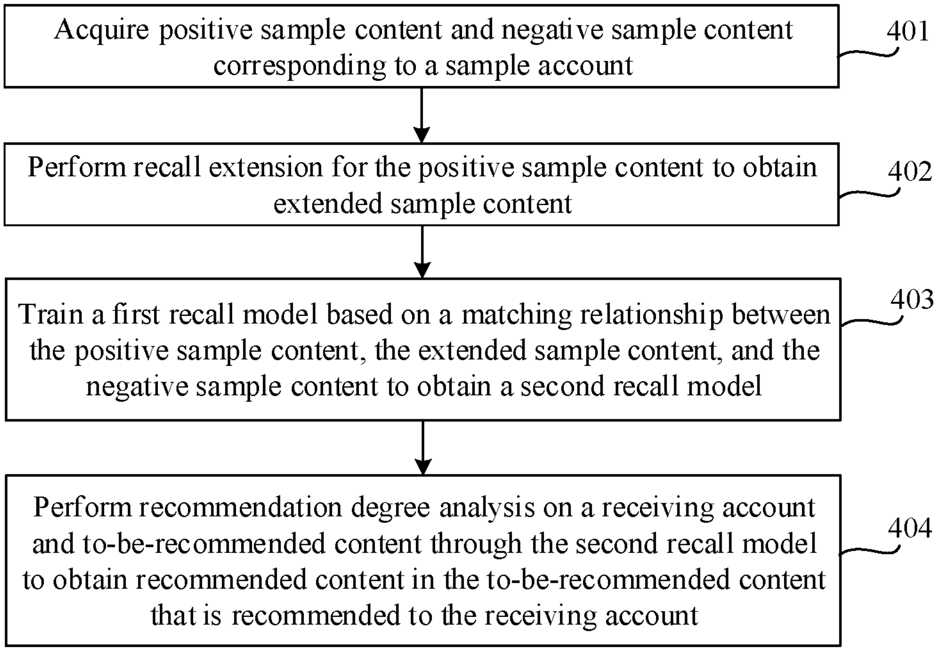
FIG. 4 is a flowchart of a content recommendation method according to an exemplary embodiment of this application.

A content recommendation method of this application is described with reference to the foregoing introduction, which may be performed by a server or a terminal alone, or may be cooperatively performed by the server and the terminal. In the embodiments of this application, a description is made by taking a situation where the method is performed by a server alone as an example, and as shown in FIG. 4, the method includes the following steps.

Step 401: Acquire positive sample content and negative sample content corresponding to a sample account.

The positive sample content includes historical recommended content having an interactive relationship with the sample account. That is, when content is recommended to the sample account within a historical time period, the sample account has an interactive relationship with the positive sample content. In some embodiments, the sample account has a positive interactive relationship with the positive sample content, and the positive interactive relationship refers to an interactive relationship in which the sample account has an interest tendency in recommended content. For example, when the sample account likes recommended content A, recommended content A is determined as positive sample content; and when the sample account comments on recommended content B, recommended content B is determined as positive sample content.

In some embodiments, after a historical time period is determined, positive sample content having an interactive relationship with the sample account within the historical time period is acquired. The historical time period is a specified time period; or the historical time period is a historical random time period; or the historical time period is a recent time period with preset duration, which is not defined herein.

A historical interaction event of the sample account within the historical time period is acquired. The historical interaction event refers to an interaction event of the sample account with the historical recommended content. Historical recommended content corresponding to the positive interactive relationship is acquired from the historical interaction event as positive sample content. An interaction event corresponds to a positive interactive relationship and a negative interactive relationship. The negative interactive relationship refers to an interactive relationship in which the sample account has a negative interest tendency in historical recommended content. For example, when the sample account quickly slides past historical recommended content A, the sample account has a negative interactive relationship with historical recommended content A; or when the sample account sets "not interested" in historical recommended content B, the sample account has a negative interactive relationship with historical recommended content B. That is, whether the sample account has a positive interest tendency or a negative interest tendency in the historical recommended content is determined according to the historical interaction event of the sample account, so as to determine the positive sample content and the negative sample content corresponding to the sample account. When a content recall model is trained, the positive sample content and the negative sample content can better enable the model to learn the content preference of the account, so as to improve the accuracy of downstream content recommendation.

The negative sample content is historical recommended content without an interactive relationship with the sample account; or the negative sample content is historical recommended content having a negative interactive relationship with the sample account.

In some embodiments, a content pool is randomly sampled to obtain negative sample content; or historical recommended content corresponding to the negative interactive relationship is acquired from the historical interaction event as negative sample content.

In some embodiments, the quantity of positive sample content is less than the quantity of negative sample content. For example, a ratio of the positive sample content to the negative sample content is usually 1:20 to 1:900.

Step 402: Perform recall extension for the positive sample content to obtain extended sample content.

The extended sample content is extended content associated with the positive sample content. The association includes at least one form of content publishing account association, content consumption account association, content publishing area association, content publishing topic association, and the like.

The content publishing account association refers to that a publishing account of the extended sample content and a publishing account of the positive sample content are associated (such as friends and co-creators) or the same account. The content consumption account association refers to that a consumption account of the extended sample content is associated with a consumption account of the positive sample content. The content publishing area association refers to that publishing sections of the extended sample content and the positive sample content in a content publishing platform are associated or the same, and the association between the publishing sections is preset. The content publishing topic association refers to that hashtags attached to the extended sample content and the positive sample content when published are associated or the same.

In this embodiment, a method for performing recall extension for the positive sample content to obtain extended sample content includes at least one of the following methods.

I. Content Publishing Account Association

A content publishing account of the positive sample content is determined; a first content set published by the content publishing account is acquired, the first content set including content published by the content publishing account within a historical time period; and extended sample content is obtained based on the first content set. When extended sample content is obtained based on the first content set, the content in the first content set is sorted based on historical interaction data corresponding to the content to obtain a first content candidate set; and the first content candidate set is filtered based on a category condition to obtain extended sample content, the category condition including a condition that a category of the extended sample content is consistent with a category of the positive sample content.

The content publishing account refers to an account that publishes the positive sample content. For example, when the positive sample content is video content, the content publishing account is a video publishing account that publishes the positive sample content; and when the positive sample content is product content, the content publishing account is a shop account that publishes the product content.

The historical interaction data refers to interaction event data correspondingly received by the content, such as like data, share data, and comment data. In some embodiments, the content in the first content set is sorted according to the quantity of interaction events in the historical interaction data. For example, the content in the first content set is sorted from high to low according to the quantity of likes corresponding to each piece of content in the historical interaction data.

Exemplarily, the positive sample content is content published by account M, that is, account M is the content publishing account, content published by account M is acquired and integrated to obtain a first content set, and content in the first content set is sorted to obtain extended sample content.

In some embodiments, the first content candidate set is filtered according to a time decay score and the category condition to obtain extended sample content. The time decay score refers to that the bigger the time difference between publishing time of content and current time, the higher the filter score of the content, and the higher the probability that the content is filtered.

There is certain similarity between content published by the same or similar content publishing accounts, and recall extension is performed for the positive sample content based on the association between the content publishing accounts, which can enable a content recall model to better learn an interest distribution from the perspective of the content publishing account, and improve the accuracy of downstream content recommendation.

II. Content Consumption Account Association

An associated account corresponding to the sample account is determined, the associated account being an account associated with the sample account; a second content set consumed by the associated account is acquired, the second content set including content consumed by the associated account within a historical time period; and extended sample content is obtained based on the second content set.

When extended sample content is obtained based on the second content set, the content in the second content set is sorted based on the association between the sample account and the associated account to obtain a second content candidate set; and the second content candidate set is filtered based on a category condition to obtain extended sample content, the category condition including a condition that a category of the extended sample content is consistent with a category of the positive sample content.

The association between the associated account and the sample account is determined based on the similarity between the two accounts; or the association between the associated account and the sample account is determined based on the degree of coincidence of interest points of the two accounts; or the association between the associated account and the sample account is determined based on the association duration of the two accounts.

Exemplarily, the positive sample content is content consumed by account P, account Q associated with account P is determined, a second content set corresponding to content consumed by account Q is acquired, and extended sample content is obtained based on the second content set.

There is certain similarity between content consumed by users with similar interests during content consumption, and recall extension is performed for the positive sample content based on the content consumed by the associated account with similar content consumption, which can enable a content recall model to better learn an interest distribution from the perspective of the content consumption account, and improve the accuracy of downstream content recommendation.

III. Content Publishing Area Association

A publishing area of the positive sample content is determined, that is, a publishing section of the positive sample content in a content publishing platform, and another published content is acquired from the publishing section as extended sample content.

IV. Content Publishing Topic Association

A hashtag attached to the positive sample content when published is acquired, and content labeled with the hashtag is acquired from a content publishing platform as extended sample content.

It is worthwhile to note that the foregoing methods for determining extended sample content are exemplary, which are not defined herein.

In addition, the foregoing methods for determining extended sample content may be implemented alone, or two or more methods may be implemented together, which is not defined herein.

Step 403: Train a first recall model based on a matching relationship between the positive sample content, the extended sample content, and the negative sample content to obtain a second recall model.

In some embodiments, the first recall model is trained based on matching relationships between the positive sample content and the sample account, between the negative sample content and the sample account, between the extended sample content and the positive sample content, and between the negative sample content and the positive sample content to obtain the second recall model.

The first recall model is a to-be-trained content recall model, the second recall model is a content recall model obtained by training the first recall model, and the foregoing second recall model is configured to recommend content to an account.

Step 404: Perform recommendation degree analysis on a receiving account and to-be-recommended content through the second recall model to obtain recommended content in the to-be-recommended content that is recommended to the receiving account.

Recommendation degree analysis is performed on the receiving account and the to-be-recommended content through the second recall model to obtain recommended content in the to-be-recommended content that is recommended to the receiving account.

In some embodiments, the receiving account and the foregoing sample account are the same account or different accounts, which is not defined herein.

In some embodiments, recommendation degree analysis is performed on the receiving account and the to-be-recommended content through the second recall model to obtain recalled content, and the recalled content is sorted and diversified to obtain recommended content that is recommended to the receiving account.

Based on the above, according to the method provided in this embodiment, recall extension is performed based on the positive sample content to obtain extended sample content, the association between the extended sample content and the positive sample content can reflect an interest distribution rather than an interest point of the sample account, the first recall model is trained based on the fusion of the interest distribution, and the trained first recall model can recall to-be-recommended content by taking the interest distribution of the account as a target, and determine recommended content that is recommended to the account, which improves the accuracy and effectiveness of content recommendation. That is, a single interest point can only characterize the strongest single interest tendency of an account, and according to the method of this application, the second recall model obtained by training is enabled to learn an interest distribution of the account. The foregoing interest distribution can not only represent the strongest interest tendency of the account, but also represent a weakened interest tendency of the account, so that a hidden variable distribution represented by a positive sample can be better fit, and the interest distribution of the account that is finally learned by the second recall model is more in line with the change of interest tendency. In this way, the accuracy of downstream content recommendation is improved, and the effectiveness of content recommendation is ensured.

According to the method provided in this embodiment, during determination of extended sample content, content published by the same content publishing account as the positive sample content is extended according to the association between content publishing accounts to obtain extended sample content, and there is association between content published by the same content publishing account, so the extended sample content reflects an interest distribution of the sample account from the side, and the recall accuracy is improved.

According to the method provided in this embodiment, during determination of extended sample content, extended sample content is determined according to the associated account, and the associated account is associated with the sample account, so there is association between interest points of the associated account and the sample account, the extended sample content reflects an interest distribution of the sample account from the side, and the recall accuracy is improved.

According to the method provided in this embodiment, after a content set (such as the first content set/second content set) is determined, content in the content set is sorted to obtain a candidate set, the candidate set is filtered based on a category condition to obtain extended sample content, and the category condition is a condition used for controlling categories of the extended sample content and the positive sample content to be the same, so the problem of low accuracy of interest distribution prediction due to different categories of the two is avoided.

Figure 5:
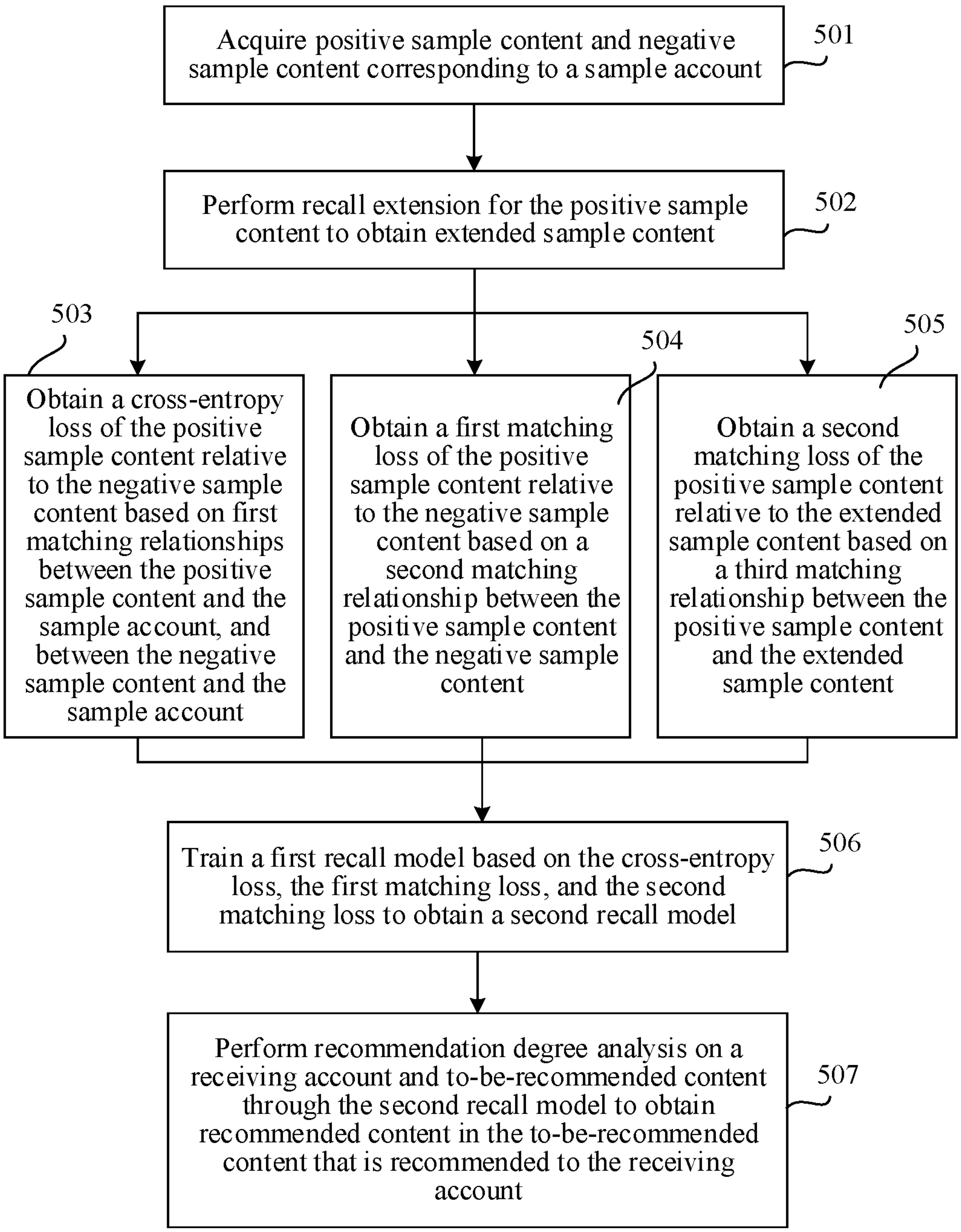
FIG. 5 is a flowchart of a content recommendation method according to another exemplary embodiment of this application.

In an embodiment, a loss is calculated based on the foregoing matching relationship first, and then the first recall model is trained based on the loss. FIG. 5 is a flowchart of a content recommendation method according to another exemplary embodiment of this application, and the method may be performed by a server or a terminal alone, or may be cooperatively performed by the server and the terminal. In the embodiments of this application, a description is made by taking a situation where the method is performed by a server alone as an example, and as shown in FIG. 5, the method includes the following steps.

Step 501: Acquire positive sample content and negative sample content corresponding to a sample account.

The positive sample content includes historical recommended content having an interactive relationship with the sample account. That is, when content is recommended to the sample account within a historical time period, the sample account has an interactive relationship with the positive sample content.

It is worthwhile to note that the content of step 501 has been described in step 401, and is not described in detail here.

Step 502: Perform recall extension for the positive sample content to obtain extended sample content.

The extended sample content is extended content associated with the positive sample content. The association includes at least one form of content publishing account association, content consumption account association, content publishing area association, content publishing topic association, and the like.

It is worthwhile to note that the content of step 502 has been described in step 402, and is not described in detail here.

Step 503: Obtain a cross-entropy loss of the positive sample content relative to the negative sample content based on first matching relationships between the positive sample content and the sample account, and between the negative sample content and the sample account.

In some embodiments, because there is an interactive relationship between the positive sample content and the sample account and there is no interactive relationship between the negative sample content and the sample account, a first matching result of the positive sample content and the sample account and a second matching result of the negative sample content and the sample account are acquired through a first recall model, and the cross-entropy loss is calculated from the first matching result and the second matching result.

Step 504: Obtain a first matching loss of the positive sample content relative to the negative sample content based on a second matching relationship between the positive sample content and the negative sample content.

In some embodiments, a positive sample feature $S_i$ of the positive sample content is extracted through the first recall model, a negative sample feature $S_j$ of the negative sample content is extracted through the first recall model, and a first matching loss of the positive sample feature relative to the negative sample feature is calculated by formula I:

$$P_{ij}=1/1+e^{(s_i-s_j)} \qquad \text{formula I:}$$

where, $P_{ij}$ represents a first matching loss.

Step 505: Obtain a second matching loss of the positive sample content relative to the extended sample content based on a third matching relationship between the positive sample content and the extended sample content.

In some embodiments, a positive sample feature $S_i$ of the positive sample content is extracted through the first recall model, an extended sample feature $S_k$ of the extended sample content is extracted through the first recall model, and a second matching loss of the positive sample feature relative to the extended sample feature is calculated by formula II:

$$P_{ik}=1/1+e^{(si-sk)} \quad \text{formula II:}$$

where, $P_{ik}$ represents a second matching loss.

In some other embodiments, a third matching loss of the extended sample content relative to the negative sample content may also be obtained based on a fourth matching relationship between the extended sample content and the negative sample content.

In some embodiments, an extended sample feature $S_k$ of the extended sample content is extracted through a first recall model, a negative sample feature $S_j$ of the negative sample content is extracted through the first recall model, and a third matching loss of the extended sample feature relative to the negative sample feature is calculated by formula III:

$$P_{kj}=1/1+e^{(sk-sj)} \quad \text{formula III:}$$

where, $P_{kj}$ represents a third matching loss.

Step 506: Train a first recall model based on the cross-entropy loss, the first matching loss, and the second matching loss to obtain a second recall model.

In some embodiments, a matching loss is obtained based on the first matching loss and the second matching loss, the cross-entropy loss is fused with the matching loss to obtain a total loss, and the first recall model is trained based on the total loss to obtain the second recall model.

In some embodiments, the weighted sum of the first matching loss and the second matching loss is taken as a matching loss, and a weight is preset or randomly determined. In some embodiments, weights of the first matching loss and the second matching loss are both 1. Exemplarily, when there is a third matching loss determined according to a fourth matching relationship between the extended sample content and the negative sample content, the foregoing matching loss is determined based on the first matching loss, the second matching loss, and the third matching loss.

The weighted sum of the cross-entropy loss and the matching loss is taken as a total loss. In some embodiments, the sum of the cross-entropy loss and the matching loss is taken as a total loss.

Model parameters of the first recall model are adjusted according to the total loss to obtain the second recall model.

That is, when a matching loss is determined based on the first matching loss and the second matching loss, and a total loss is determined based on the matching loss and the cross-entropy loss, the losses may be fused based on different weights, so that a parameter adjustment gradient in the training process of the model is adjusted based on different fine granularities. In this way, the prediction accuracy of the second recall model obtained by downstream training is optimized, and the recommendation accuracy of content recommendation is improved.

In some embodiments, the first recall model is circularly and iteratively trained based on the total loss obtained by round iterative computation to obtain the second recall model.

Step 507: Perform recommendation degree analysis on a receiving account and to-be-recommended content through the second recall model to obtain recommended content in the to-be-recommended content that is recommended to the receiving account.

Recommendation degree analysis is performed on the receiving account and the to-be-recommended content through the second recall model to obtain recommended content in the to-be-recommended content that is recommended to the receiving account.

In some embodiments, recommendation degree analysis is performed on the receiving account and the to-be-recommended content through the second recall model to obtain recalled content, and the recalled content is sorted and diversified to obtain recommended content that is recommended to the receiving account.

Based on the above, according to the method provided in this embodiment, recall extension is performed based on the positive sample content to obtain extended sample content, the association between the extended sample content and the positive sample content can reflect an interest distribution rather than an interest point of the sample account, the first recall model is trained based on the fusion of the interest distribution, and the trained first recall model can recall to-be-recommended content by taking the interest distribution of the account as a target, and determine recommended content that is recommended to the account, which improves the accuracy and effectiveness of content recommendation. That is, a single interest point can only characterize the strongest single interest tendency of an account, and according to the method of this application, the second recall model obtained by training is enabled to learn an interest distribution of the account. The foregoing interest distribution can not only represent the strongest interest tendency of the account, but also represent a weakened interest tendency of the account, so that a hidden variable distribution represented by a positive sample can be better fit, and the interest distribution of the account that is finally learned by the second recall model is more in line with the change of interest tendency. In this way, the accuracy of downstream content recommendation is improved, and the effectiveness of content recommendation is ensured.

According to the method provided in this embodiment, a cross-entropy loss of the positive sample content relative to the negative sample content is calculated, a matching loss of the positive sample content, the negative sample content, and the extended sample content is additionally used on the basis of the cross-entropy loss, and the first recall model is trained based on the cross-entropy loss and the matching loss. In this way, on the basis of ensuring the interest prediction accuracy of the second recall model, the description of distribution model construction is added, which improves the recall accuracy of the second recall model.

Figure 6:
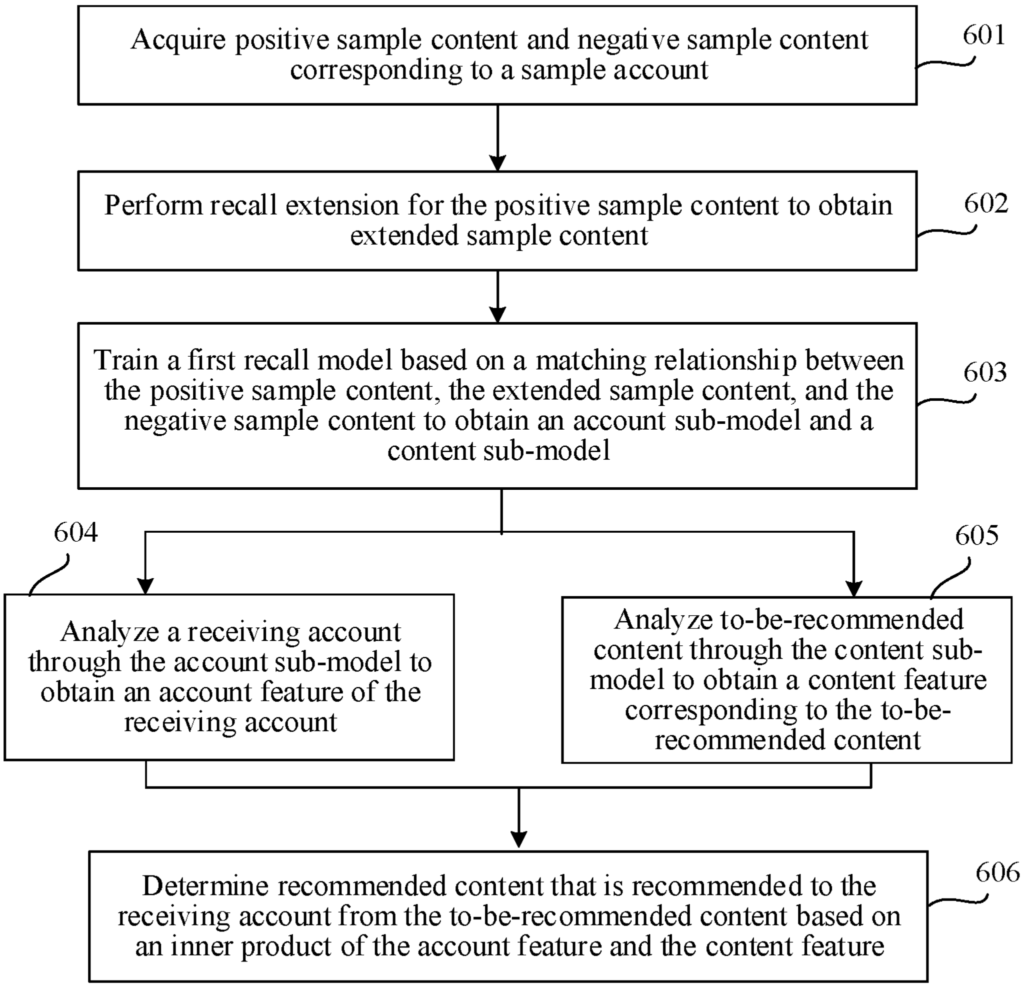
FIG. 6 is a flowchart of a content recommendation method according to another exemplary embodiment of this application.

In an embodiment, the foregoing second recall model is implemented as a two-tower model, that is, the second recall model includes an account sub-model (corresponding to a user tower) and a content sub-model (corresponding to a feed tower). FIG. 6 is a flowchart of a content recommendation method according to another exemplary embodiment of this application, and the method may be performed by a server or a terminal alone, or may be cooperatively performed by the server and the terminal. In the embodiments of this application, a description is made by taking a situation where the method is performed by a server alone as an example, and as shown in FIG. 6, the method includes the following steps.

Step 601: Acquire positive sample content and negative sample content corresponding to a sample account.

The positive sample content includes historical recommended content having an interactive relationship with the sample account. That is, when content is recommended to the sample account within a historical time period, the sample account has an interactive relationship with the positive sample content.

It is worthwhile to note that the content of step 601 has been described in step 401, and is not described in detail here.

Step 602: Perform recall extension for the positive sample content to obtain extended sample content.

The extended sample content is extended content associated with the positive sample content. The association includes at least one form of content publishing account association, content consumption account association, content publishing area association, content publishing topic association, and the like.

It is worthwhile to note that the content of step 602 has been described in step 402, and is not described in detail here.

Step 603: Train a first recall model based on a matching relationship between the positive sample content, the extended sample content, and the negative sample content to obtain an account sub-model and a content sub-model.

The account sub-model and the content sub-model constitute a second recall model configured to recommend content to an account.

The account sub-model is configured to analyze account information, and the content sub-model is configured to analyze content data.

Step 604: Analyze a receiving account through the account sub-model to obtain an account feature of the receiving account.

In some embodiments, the first recall model is trained to obtain the account sub-model and the content sub-model that are respectively configured to extract features of an account and content. The account sub-model and the content sub-model are implemented as deep neural network (DNN) models.

When the account sub-model is implemented as an online model, the account sub-model obtained by offline training is converted into a lightweight inference format for online real-time application.

In some embodiments, the receiving account is inputted into the account sub-model, and a feature of the receiving account is extracted layer by layer through neural network layers in the account sub-model to finally obtain an account feature corresponding to the receiving account. When the receiving account is inputted into the account sub-model, account information of the receiving account is acquired and inputted into the account sub-model in a preset format. For example, an account identifier, browsing history, sex data, age data, and the like corresponding to the receiving account are acquired, and the account information is converted into a unified data format and arranged and connected in sequence according to a preset order to obtain to-be-inputted content. The to-be-inputted content is inputted into the account sub-model to output an account feature corresponding to the receiving account.

Step 605: Analyze to-be-recommended content through the content sub-model to obtain a content feature corresponding to the to-be-recommended content.

In some embodiments, the to-be-recommended content is all content in a candidate pool; or the to-be-recommended content is candidate content obtained by preliminarily filtering the candidate pool; or the to-be-recommended content is candidate content in a specified format or of a specified type in the candidate pool, which is not defined herein.

In some embodiments, the to-be-recommended content is sequentially or simultaneously inputted into the content sub-model, and a feature of the to-be-recommended content is extracted layer by layer through neural network layers in the content sub-model to finally obtain a content feature corresponding to the to-be-recommended content.

When the to-be-recommended content is inputted into the content sub-model, text content, image content, audio content, and the like in the to-be-recommended content are acquired and inputted into the content sub-model by a preset method. For example, when the to-be-recommended content includes text content, the text content is inputted into a text extraction channel of the content sub-model; when the to-be-recommended content includes image content, the image content is inputted into an image extraction channel of the content sub-model; when the to-be-recommended content includes audio content, the audio content is inputted into an audio extraction channel of the content sub-model; or a feature of the text content, the image content or the audio content in the to-be-recommended content is extracted through a unified feature extraction channel of the content sub-model.

After the feature of the to-be-recommended content is extracted through the content sub-model, the content feature corresponding to the to-be-recommended content is outputted.

Step 606: Determine recommended content that is recommended to the receiving account from the to-be-recommended content based on an inner product of the account feature and the content feature.

In some embodiments, inner products of the account feature and the content features are respectively calculated, the to-be-recommended content is sorted according to the inner products, the first K pieces of sorted to-be-recommended content are determined as a recall result, and K is a positive integer.

In some embodiments, inner products of vectors of the account feature and the content features are respectively calculated, the to-be-recommended content is sorted from small to large according to the inner products of vectors, and the first K pieces of sorted to-be-recommended content are determined as a recall result.

In some embodiments, recalled content is determined from the to-be-recommended content through the second recall model first, and recommended content is determined from the recalled content according to subsequent interest analysis.

Figure 7:
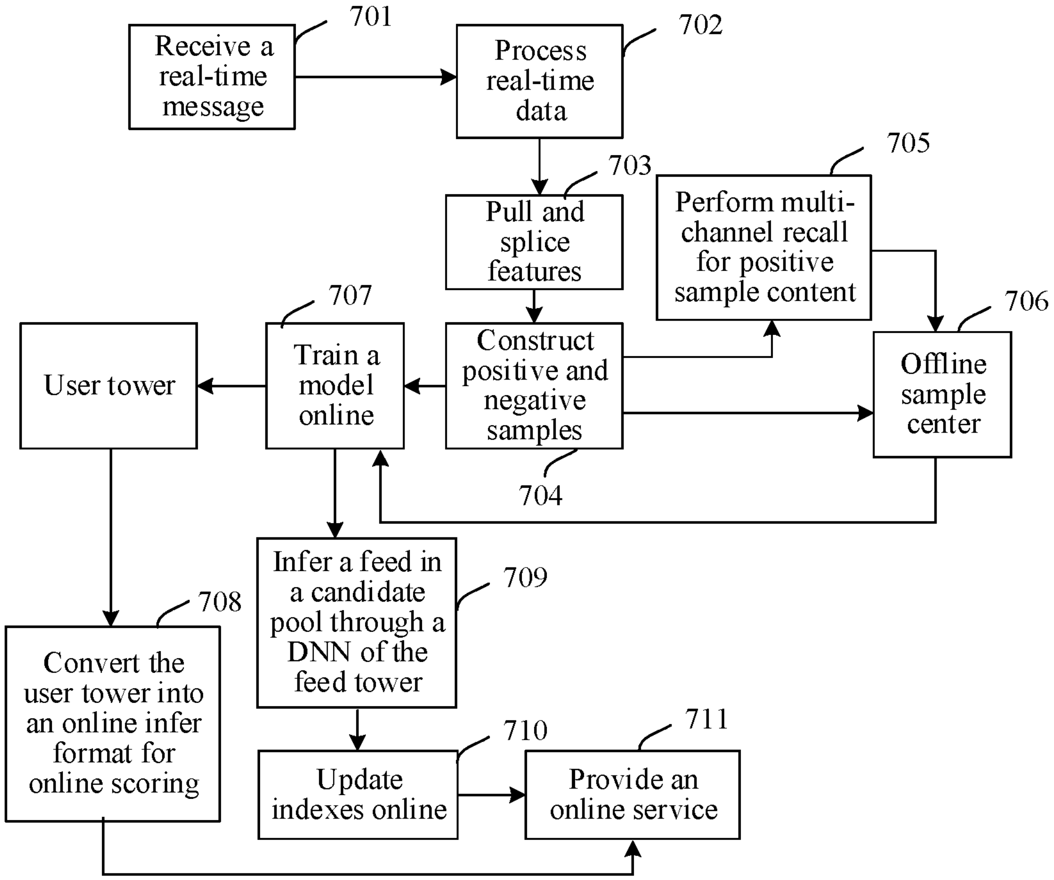
FIG. 7 is a schematic diagram of a whole content recall process according to an exemplary embodiment of this application.

Exemplarily, FIG. 7 is a flowchart of a whole content recall process according to an exemplary embodiment of this application, and as shown in FIG. 7, the process includes the following steps. Step 701: Receive a real-time message. The real-time message refers to a message corresponding to user behavior that is generated when an account browses content. After a user likes content A and user behavior data is generated, a real-time message is acquired, and the user behavior data is aggregated according to a session. Step 702: Process real-time data. Real-time user behavior data is acquired from the real-time message for analysis and processing. Step 703: Pull and splice features. The user behavior data is pulled and features are spliced, and whether corresponding content belongs to positive sample content or negative sample content is determined according to the user behavior data. Step 704: Construct positive and negative samples. Positive sample data is acquired according to the user behavior data, and negative sample data is acquired by random sampling. Step 705: Perform multi-channel recall for positive sample content to obtain extended sample content. Step 706: Store the positive and negative sample content and the extended sample content into an offline sample center. Subsequently, sample content can be directly acquired from the offline sample center for model training. Step 707: Acquire the positive and negative samples and the extended sample content, and train a model online. In some embodiments, the model is trained through multi-loss fusion computation to obtain a user tower and a feed tower. Step 708: Convert the user tower into an online infer format for online scoring. A general training framework is, for example, tensorflow pytorch, which includes forward inference and reverse gradient optimization of a DNN, and online inference requires forward inference only, so the user tower is converted into a more lightweight inference format such as onnx. Step 709: Infer a feed in a candidate pool through a DNN of the feed tower. In some embodiments, a feature of the feed in the candidate pool is extracted through the feed tower. In some embodiments, the feed tower needs to perform minute-level offline updating rather than online real-time scoring, and it is necessary to use the model to cache content features obtained by offline scoring all candidate sets into an online memory. Step 710: Update indexes online. After the feature of the feed is extracted, an index pool is updated, so that the user feature can be indexed on the feed. Step 711: Provide an online service. That is, an online recall and scoring service is performed. After recalled content corresponding to the account is obtained by indexing the account feature and to the feed feature, content is recommended to the account based on the recalled content.

Based on the above, according to the method provided in this embodiment, recall extension is performed based on the positive sample content to obtain extended sample content, the association between the extended sample content and the positive sample content can reflect an interest distribution rather than an interest point of the sample account, the first recall model is trained based on the fusion of the interest distribution, and the trained first recall model can recall to-be-recommended content by taking the interest distribution of the account as a target, and determine recommended content that is recommended to the account, which improves the accuracy and effectiveness of content recommendation. That is, a single interest point can only characterize the strongest single interest tendency of an account, and according to the method of this application, the second recall model obtained by training is enabled to learn an interest distribution of the account. The foregoing interest distribution can not only represent the strongest interest tendency of the account, but also represent a weakened interest tendency of the account, so that a hidden variable distribution represented by a positive sample can be better fit, and the interest distribution of the account that is finally learned by the second recall model is more in line with the change of interest tendency. In this way, the accuracy of downstream content recommendation is improved, and the effectiveness of content recommendation is ensured.

According to the method provided in this embodiment, the content is recalled and recommended to the receiving account through the two-tower model, and the characteristics of parallel and independent operation of the user tower and the feed tower are utilized, so that the recall efficiency and recall accuracy are improved.

Figure 8:
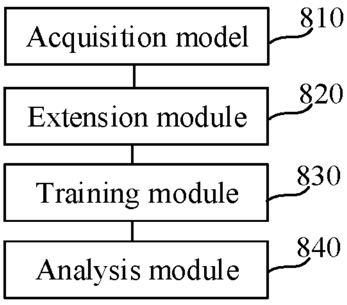
FIG. 8 is a structural block diagram of a content recommendation apparatus according to an exemplary embodiment of this application.

FIG. 8 is a structural block diagram of a content recommendation apparatus according to an exemplary embodiment of this application, and as shown in FIG. 8, the apparatus includes:

- an acquisition module 810, configured to acquire positive sample content and negative sample content corresponding to a sample account, the positive sample content including historical recommended content having an interactive relationship with the sample account;
- an extension module 820, configured to perform recall extension for the positive sample content to obtain extended sample content, the extended sample content being extended content associated with the positive sample content;
- a training module 830, configured to train a first recall model based on a matching relationship between the positive sample content, the extended sample content, and the negative sample content to obtain a second recall model, the second recall model being configured to recommend content to an account; and
- an analysis module 840, configured to perform recommendation degree analysis on a receiving account and to-be-recommended content through the second recall model to obtain recommended content in the to-be-recommended content that is recommended to the receiving account.

Figure 9:
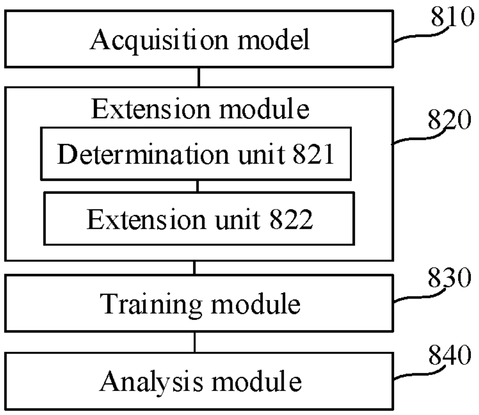
FIG. 9 is a structural block diagram of a content recommendation apparatus according to another exemplary embodiment of this application.

In an embodiment, as shown in FIG. 9, the extension module 820 includes:

- a determination unit 821, configured to determine a content publishing account of the positive sample content; and
- an extension unit 822, configured to acquire a first content set published by the content publishing account, the first content set including content published by the content publishing account within a historical time period, and obtain the extended sample content based on the first content set.

In an embodiment, the extension unit 822 is further configured to sort the content in the first content set based on historical interaction data corresponding to the content to obtain a first content candidate set, and filter the first content candidate set based on a category condition to obtain the extended sample content, the category condition including a condition that a category of the extended sample content is consistent with a category of the positive sample content.

In an embodiment, the extension module 820 includes:

- a determination unit 821, configured to determine associated account corresponding to the sample account, the associated account being an account associated with the sample account; and
- an extension unit 822, configured to acquire a second content set consumed by the associated account, the second content set including content consumed by the associated account within a historical time period, and obtain the extended sample content based on the second content set.

In an embodiment, the extension unit 822 is further configured to sort the content in the second content set based on the association between the sample account and the associated account to obtain a second content candidate set, and filter the second content candidate set based on a category condition to obtain the extended sample content, the category condition including a condition that a category of the extended sample content is consistent with a category of the positive sample content.

In an embodiment, the training module 830 is further configured to obtain a cross-entropy loss of the positive sample content relative to the negative sample content based on first matching relationships between the positive sample content and the sample account, and between the negative sample content and the sample account;

- the training module 830 is further configured to obtain a first matching loss of the positive sample content relative to the negative sample content based on a second matching relationship between the positive sample content and the negative sample content;

the training module 830 is further configured to obtain a second matching loss of the positive sample content relative to the extended sample content based on a third matching relationship between the positive sample content and the extended sample content; and the training module 830 is further configured to train the first recall model based on the cross-entropy loss, the first matching loss, and the second matching loss to obtain the second recall model.

In an embodiment, the training module 830 is further configured to obtain a matching loss based on the first matching loss and the second matching loss, fuse the cross-entropy loss with the matching loss to obtain a total loss, and train the first recall model based on the total loss to obtain the second recall model.

In an embodiment, the training module 830 is further configured to train the first recall model based on the matching relationship between the positive sample content, the extended sample content, and the negative sample content to obtain an account sub-model and a content sub-model, the account sub-model being configured to analyze account information, and the content sub-model being configured to analyze content data.

In an embodiment, the analysis module 840 is further configured to analyze the receiving account through the account sub-model to obtain an account feature of the receiving account, analyze the to-be-recommended content through the content sub-model to obtain a content feature of the to-be-recommended content, and determine recommended content that is recommended to the receiving account from the to-be-recommended content based on an inner product of the account feature and the content feature.

In an embodiment, the acquisition module 810 is further configured to acquire a historical interaction event of the sample account within the historical time period, the historical interaction event being an interaction event of the sample account with the historical recommended content, acquire historical recommended content corresponding to a positive interactive relationship from the historical interaction event as the positive sample content, and acquire negative sample content corresponding to the sample account.

In an embodiment, the acquisition module 810 is further configured to randomly sample a content pool to obtain the negative sample content;

or the acquisition module 810 is further configured to acquire historical recommended content corresponding to a negative interactive relationship from the historical interaction event as the negative sample content.

Based on the above, according to the apparatus provided in this embodiment, recall extension is performed based on the positive sample content to obtain extended sample content, the association between the extended sample content and the positive sample content can reflect an interest distribution rather than an interest point of the sample account, the first recall model is trained based on the fusion of the interest distribution, and the trained first recall model can recall to-be-recommended content by taking the interest distribution of the account as a target, and determine recommended content that is recommended to the account, which improves the accuracy and effectiveness of content recommendation. That is, a single interest point can only characterize the strongest single interest tendency of an account, and according to the method of this application, the second recall model obtained by training is enabled to learn an interest distribution of the account. The foregoing interest distribution can not only represent the strongest interest tendency of the account, but also represent a weakened interest tendency of the account, so that a hidden variable distribution represented by a positive sample can be better fit, and the interest distribution of the account that is finally learned by the second recall model is more in line with the change of interest tendency. In this way, the accuracy of downstream content recommendation is improved, and the effectiveness of content recommendation is ensured.

The content recommendation apparatus according to the foregoing embodiments is described with an example of division of the foregoing function modules. In practical application, the foregoing functions may be allocated to and completed by different function modules according to requirements, that is, an internal structure of a device is divided into different function modules, so as to complete all or some of the foregoing functions. In addition, the content recommendation apparatus according to the foregoing embodiments and the content recommendation method embodiments fall within the same conception, and a specific implementation process of the content recommendation apparatus refers to the method embodiments, which is not described in detail here.

Figure 10:
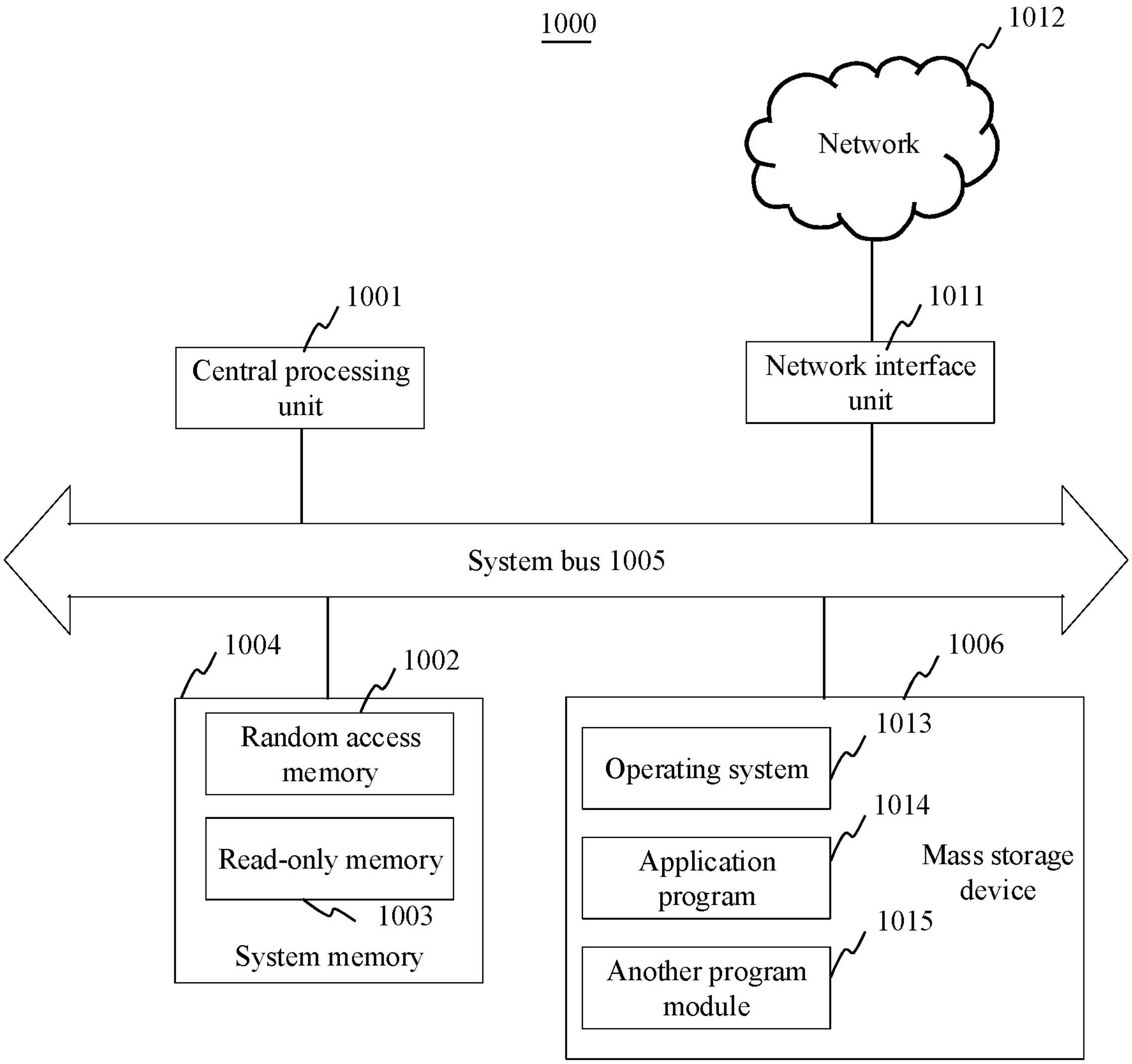
FIG. 10 is a structural block diagram of a computer device according to an exemplary embodiment of this application.

FIG. 10 is a schematic structural diagram of a server according to an exemplary embodiment of this application. The server may be the terminal or the server shown in FIG. 3.

Specifically, a server 1000 includes a central processing unit (CPU) 1001, a system memory 1004 including a random access memory (RAM) 1002 and a read-only memory (ROM) 1003, and a system bus 1005 connecting the system memory 1004 to the CPU 1001. The server 1000 further includes a mass storage device 1006 configured to store an operating system 1013, an application program 1014, and another program module 1015.

The mass storage device 1006 is connected to the CPU 1001 through a mass storage controller (not shown) that is connected to the system bus 1005. The mass storage device 1006 and a computer-readable medium associated with the mass storage device 1006 provide non-volatile storage for the server 1000.

Without loss of generality, the computer-readable medium may include a computer storage medium and a communication medium. The foregoing system memory 1004 and mass storage device 1006 may be collectively referred to as a memory.

According to the embodiments of this application, the server 1000 may be connected to a network 1012 through a network interface unit 1011 that is connected to the system bus 1005, or may be connected to a network of another type or a remote computer system (not shown) through the network interface unit 1011.

The foregoing memory further includes one or more programs, which are stored in the memory and are configured to be executed by the CPU.

The embodiments of this application further provide a computer device, which may be implemented as the terminal or the server shown in FIG. 2. The computer device includes a processor and a memory, and the memory stores at least one piece of instruction, at least one segment of program, a code set or an instruction set that, when loaded and executed by the processor, implements the content recommendation method according to the foregoing method embodiments.

The embodiments of this application further provide a non-transitory computer-readable storage medium, which stores at least one piece of instruction, at least one segment of program, a code set or an instruction set that, when loaded and executed by a processor, implements the content recommendation method according to the foregoing method embodiments.

The embodiments of this application further provide a computer program product or computer program, which includes a computer instruction. The computer instruction is stored in a non-transitory computer-readable storage medium. A processor of a computer device reads the computer instruction from the computer-readable storage medium and executes the computer instruction to cause the computer device to perform the content recommendation method according to any one of the foregoing embodiments.

In some embodiments, the computer-readable medium may include: a read-only memory (ROM), a random access memory (RAM), a solid state drive (SSD), an optical disc, and the like. The RAM may include a resistance random access memory (ReRAM) and a dynamic random access memory (DRAM). The sequence numbers of the foregoing embodiments of this application are merely for description purpose but do not imply the preference among the embodiments. In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

What is claimed is:

1. A content recommendation method, performed by a computer device, the method comprising:
- acquiring positive sample content and negative sample content corresponding to a sample account;
- extending the positive sample content via recall extension to obtain extended sample content, further including:
  - determining an associated account associated with the sample account;
  - acquiring a second content set consumed by the associated account within a historical time period; and
  - obtaining the extended sample content based on the second content set; and
- training a first recall model based on a matching relationship between the positive sample content, the extended sample content, and the negative sample content to obtain a second recall model, wherein the second recall model is configured to recommend content to an account.

2. The method according to claim 1, wherein the second recall model is configured to recommend content to an account by:
- performing recommendation degree analysis on the account and to-be-recommended content through the second recall model to obtain recommended content in the to-be-recommended content; and
- sending the recommended content to the account.

3. The method according to claim 1, wherein the extending the positive sample content via recall extension to obtain extended sample content comprises:
- determining a content publishing account of the positive sample content;
- acquiring a first content set published by the content publishing account within a historical time period; and
- obtaining the extended sample content based on the first content set.

4. The method according to claim 1, wherein the training a first recall model based on a matching relationship between the positive sample content, the extended sample content, and the negative sample content to obtain a second recall model comprises:
- training the first recall model based on the matching relationship between the positive sample content, the extended sample content, and the negative sample content to obtain an account sub-model and a content sub-model, the account sub-model being configured to analyze account information, and the content sub-model being configured to analyze content data.

5. The method according to claim 1, wherein the positive sample content corresponding to the sample account is acquired by:
- acquiring a historical interaction event of the sample account with historical recommended content within a historical time period; and
- identifying historical recommended content corresponding to a positive interactive relationship from the historical interaction event as the positive sample content.

6. The method according to claim 1, wherein the negative sample content corresponding to the sample account is acquired by:
- randomly sampling a content pool to obtain the negative sample content;

or
- acquiring historical recommended content corresponding to a negative interactive relationship from the historical interaction event as the negative sample content.

7. A computer device, comprising a processor and a memory, the memory storing at least one segment of program that, when loaded and executed by the processor, causes the computer device to implement a content recommendation method including:
- acquiring positive sample content and negative sample content corresponding to a sample account;
- extending the positive sample content via recall extension to obtain extended sample content; and
- extending the positive sample content via recall extension to obtain extended sample content, further including:
  - determining an associated account associated with the sample account;
  - acquiring a second content set consumed by the associated account within a historical time period; and
  - obtaining the extended sample content based on the second content set; and
- training a first recall model based on a matching relationship between the positive sample content, the extended sample content, and the negative sample content to obtain a second recall model, wherein the second recall model is configured to recommend content to an account.

8. The computer device according to claim 7, wherein the second recall model is configured to recommend content to an account by:
- performing recommendation degree analysis on the account and to-be-recommended content through the second recall model to obtain recommended content in the to-be-recommended content; and
- sending the recommended content to the account.

9. The computer device according to claim 7, wherein the extending the positive sample content via recall extension to obtain extended sample content comprises:

determining a content publishing account of the positive sample content;

acquiring a first content set published by the content publishing account within a historical time period; and obtaining the extended sample content based on the first content set.

10. The computer device according to claim 7, wherein the training a first recall model based on a matching relationship between the positive sample content, the extended sample content, and the negative sample content to obtain a second recall model comprises:

training the first recall model based on the matching relationship between the positive sample content, the extended sample content, and the negative sample content to obtain an account sub-model and a content sub-model, the account sub-model being configured to analyze account information, and the content sub-model being configured to analyze content data.

11. The computer device according to claim 7, wherein the positive sample content corresponding to the sample account is acquired by:

acquiring a historical interaction event of the sample account with historical recommended content within a historical time period; and identifying historical recommended content corresponding to a positive interactive relationship from the historical interaction event as the positive sample content.

12. The computer device according to claim 7, wherein the negative sample content corresponding to the sample account is acquired by:

randomly sampling a content pool to obtain the negative sample content;

or acquiring historical recommended content corresponding to a negative interactive relationship from the historical interaction event as the negative sample content.

13. A non-transitory computer-readable storage medium, storing at least one segment of program that, when loaded and executed by a processor of a computer device, causes the computer device to implement a content recommendation method including:

acquiring positive sample content and negative sample content corresponding to a sample account;

extending the positive sample content via recall extension to obtain extended sample content, further including:

determining an associated account associated with the sample account;

acquiring a second content set consumed by the associated account within a historical time period; and obtaining the extended sample content based on the second content set; and training a first recall model based on a matching relationship between the positive sample content, the extended sample content, and the negative sample content to obtain a second recall model, wherein the second recall model is configured to recommend content to an account.

14. The non-transitory computer-readable storage medium according to claim 13, wherein the second recall model is configured to recommend content to an account by:

performing recommendation degree analysis on the account and to-be-recommended content through the second recall model to obtain recommended content in the to-be-recommended content; and sending the recommended content to the account.

15. The non-transitory computer-readable storage medium according to claim 13, wherein the extending the positive sample content via recall extension to obtain extended sample content comprises:

determining a content publishing account of the positive sample content;

acquiring a first content set published by the content publishing account within a historical time period; and obtaining the extended sample content based on the first content set.

16. The non-transitory computer-readable storage medium according to claim 13, wherein the training a first recall model based on a matching relationship between the positive sample content, the extended sample content, and the negative sample content to obtain a second recall model comprises:

training the first recall model based on the matching relationship between the positive sample content, the extended sample content, and the negative sample content to obtain an account sub-model and a content sub-model, the account sub-model being configured to analyze account information, and the content sub-model being configured to analyze content data.

17. The non-transitory computer-readable storage medium according to claim 13, wherein the positive sample content corresponding to the sample account is acquired by:

acquiring a historical interaction event of the sample account with historical recommended content within a historical time period; and identifying historical recommended content corresponding to a positive interactive relationship from the historical interaction event as the positive sample content.

* * * * *